(12) United States Patent
Zhang et al.

(10) Patent No.: US 11,106,318 B2
(45) Date of Patent: Aug. 31, 2021

(54) METHOD AND SYSTEM FOR TRANSMITTING SIGNAL, ACTIVE STYLUS, TOUCH SCREEN AND READABLE STORAGE MEDIUM

(71) Applicant: Shenzhen Goodix Technology Co., Ltd., Shenzhen (CN)

(72) Inventors: Guanjun Zhang, Shenzhen (CN); Lingyu Tang, Shenzhen (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/037,531

(22) Filed: Sep. 29, 2020

(65) Prior Publication Data
US 2021/0011579 A1 Jan. 14, 2021

Related U.S. Application Data

(63) Continuation of application No. PCT/CN2019/079550, filed on Mar. 25, 2019.

(51) Int. Cl.
*G06F 3/044* (2006.01)
*G06F 3/0354* (2013.01)
*G06F 3/038* (2013.01)

(52) U.S. Cl.
CPC .......... *G06F 3/0441* (2019.05); *G06F 3/0383* (2013.01); *G06F 3/03545* (2013.01)

(58) Field of Classification Search
CPC .. G06F 3/03545; G06F 3/0383; G06F 3/0441; G06F 3/04162

USPC ......................................................... 345/179
See application file for complete search history.

(56) References Cited

U.S. PATENT DOCUMENTS

| | | | |
|---|---|---|---|
| 2016/0226540 A1 | 8/2016 | Fujii | |
| 2017/0108963 A1* | 4/2017 | Mao | G06F 3/0442 |
| 2017/0192534 A1 | 7/2017 | Han et al. | |
| 2020/0064941 A1* | 2/2020 | Chang | G06F 3/0416 |

(Continued)

FOREIGN PATENT DOCUMENTS

| | | |
|---|---|---|
| CN | 203084673 U | 7/2013 |
| CN | 103941889 A | 7/2014 |

(Continued)

OTHER PUBLICATIONS

Shenzhen Goodix Technology Co., Ltd., Extended European Search Report, EP19920633.5, dated Apr. 12, 2021, 11 pgs.

(Continued)

*Primary Examiner* — Koosha Sharifi-Tafreshi
(74) *Attorney, Agent, or Firm* — USCH Law, PC

(57) ABSTRACT

Some embodiments of the present disclosure provide a method and a system for transmitting a signal, an active stylus, a touch screen and a readable storage medium. The method for transmitting a signal comprises: receiving a DSSS signal sent by the touch screen through a coupling capacitor formed between the active stylus and the touch screen, where the DSSS signal is a spread-spectrum coded signal to be transmitted; and parsing the received DSSS signal to obtain the signal to be transmitted. The method requires just a small amount of additional hardware resources and low power consumption, and can be well applied to an active stylus touch system.

20 Claims, 11 Drawing Sheets

(56) References Cited

U.S. PATENT DOCUMENTS

2020/0125188 A1* 4/2020 Meng .................. G06F 3/04162

FOREIGN PATENT DOCUMENTS

| CN | 105468170 A | 4/2016 |
|----|-------------|--------|
| CN | 107066122 A | 8/2017 |

OTHER PUBLICATIONS

Qingbo Chen et al., "Implementation and Experimental Demonstration of a Real-time 7-DSSS VLC System Based on FPGA," $15^{th}$ International Conference on Optical Communications and Networks (ICOCN), *IEEE*, Sep. 24, 2016, 3 pgs.

Shenzhen Goodix Technology Co., Ltd., International Search Report, PCT/CN2019/079550, dated Jan. 2, 2020, 5 pgs.

* cited by examiner

US 11,106,318 B2

METHOD AND SYSTEM FOR TRANSMITTING SIGNAL, ACTIVE STYLUS, TOUCH SCREEN AND READABLE STORAGE MEDIUM

CROSS-REFERENCE TO RELATED APPLICATION

This application is a continuation of PCT Application No. PCT/CN2019/079550, filed Mar. 25, 2019, which is incorporated herein by reference in its entirety.

TECHNICAL FIELD

The present disclosure relates to touch technologies, and more particularly, to a method and a system for transmitting a signal, an active stylus, a touch screen and a readable storage medium.

BACKGROUND

In a current type of an active stylus touch system, a touch screen may send a direct sequence spread spectrum (DSSS) signal to a stylus end to communicate with the stylus end, so as to perform operations such as synchronizing with the stylus end and sending a command to the stylus end. Thus, how the stylus end correctly receives the DSSS signal sent by the screen end becomes critical.

In existing technologies, DSSS signal transmission is usually applied in a radio frequency environment, that is, the DSSS signal is transmitted and received through a high-frequency antenna. However, the inventor(s) found that, conditions such as impedance of a screen sensor itself limit spectrum spreading of the DSSS signal, so a mode of transmitting and receiving the DSSS signal through the high-frequency antenna is not applicable to the active stylus touch system that has strict requirements on structure, size and power consumption, and the like.

SUMMARY

An objective of some embodiments of the present disclosure is to provide a method and a system for transmitting a signal, an active stylus, a touch screen and a readable storage medium. The touch screen transmits a DSSS signal to the active stylus through capacitive coupling, which can be well applied to an active stylus touch system that has strict requirements on structure, size and power consumption, and the like.

An embodiment of the present disclosure provides a method for transmitting a signal, applied to an active stylus, and including: receiving a DSSS signal sent by a touch screen through a coupling capacitor formed between the active stylus and the touch screen, where the DSSS signal is a spread-spectrum coded signal to be transmitted; and parsing the received DSSS signal to obtain a signal to be transmitted.

An embodiment of the present disclosure provides a method for transmitting a signal, applied to a touch screen, and including: performing spread-spectrum coding on a signal to be transmitted to generate a DSSS signal; and sending the DSSS signal to an active stylus through a coupling capacitor formed between the active stylus and the touch screen, for the active stylus to parse the received DSSS signal, to obtain the signal to be transmitted.

An embodiment of the present disclosure further provides an active stylus, including: at least one processor; and a memory connected and in communication with the at least one processor, where the memory stores instructions executable by the at least one processor, and the instructions, when executed by the at least one processor, causes the at least one processor to perform the above-described method for transmitting a signal applied to the active stylus.

An embodiment of the present disclosure further provides a touch screen, including: at least one processor; and a memory connected and in communication with the at least one processor, where the memory stores instructions executable by the at least one processor, and the instructions, when executed by the at least one processor, causes the at least one processor to perform the above-described method for transmitting a signal applied to the touch screen.

An embodiment of the present disclosure further provides a system for transmitting a signal, including: a touch screen and an active stylus, where the touch screen is configured to perform spread-spectrum coding on a signal to be transmitted to generate a DSSS signal; the touch screen is further configured to send the DSSS signal to the active stylus through a coupling capacitor formed between the touch screen and the active stylus; and the active stylus is configured to parse the received DSSS signal, to obtain the signal to be transmitted.

An embodiment of the present disclosure further provides a computer-readable storage medium storing a computer program, where the computer program, when executed by a processor, performs the above-described method for transmitting a signal.

An embodiment of the present disclosure further provides a chip, including: a pre-amplifier circuit, configured to pre-amplify a DSSS signal sent by a touch screen and received through a coupling capacitor formed between an active stylus and the touch screen, and output the pre-amplified DSSS signal to a hysteresis comparing circuit; the hysteresis comparing circuit, configured to restore the pre-amplified DSSS signal to obtain a restored DSSS signal, and output the restored DSSS signal to a digital demodulating circuit; and the digital demodulating circuit, configured to demodulate the restored DSSS signal.

An embodiment of the present disclosure further provides an active stylus, including the above-described chip.

Compared with existing technologies, the DSSS signal sent by the touch screen is received through the coupling capacitor formed between the active stylus and the touch screen in the embodiments of the present disclosure, where the DSSS signal is a spread-spectrum coded signal to be transmitted, and the active stylus parses the received DSSS signal to obtain the signal to be transmitted. In the embodiments of the present disclosure, the DSSS signal is transmitted through the coupling capacitor formed between the active stylus and the touch screen, which can be well applied in the touch system. The inventor(s) found that, in the touch system, conditions such as impedance of a screen sensor itself limit spectrum spreading of the DSSS signal, that is, in the touch system, as affected by parasitic parameters of a screen body, a spectrum of the DSSS signal may not be spread too wide. According to the Universal Stylus Initiative (USI), the spectrum of the DSSS signal is only up to 1 MHz, which cannot reach a radio frequency level. In addition, due to relatively strict requirements of the active stylus on a structure, a size and power consumption, and the like, that is, a relatively small size of the active stylus in an actual application, if the DSSS signal is transmitted through a radio frequency antenna, a size of the radio frequency antenna inside the active stylus will be limited, which further fails to reach the radio frequency level. Therefore, DSSS signal transmission in a mode of traditional radio frequency is not applicable to the touch system. In the embodiments of the present disclosure, the DSSS signal is transmitted through the coupling capacitor formed between the active stylus and the touch screen, which can be well applied to DSSS signal transmission in the touch system, and at the same time, can also meet the strict requirements of the active stylus on the structure, the size and power consumption.

For example, parsing the received DSSS signal to obtain the signal to be transmitted includes: pre-amplifying, by the pre-amplifier circuit, the received DSSS signal; inputting, by the pre-amplifier circuit, the pre-amplified DSSS signal into the hysteresis comparing circuit; restoring, by the hysteresis comparing circuit, the pre-amplified DSSS signal to obtain a restored DSSS signal; inputting, by the hysteresis comparing circuit, the restored DSSS signal to the digital demodulating circuit; demodulating, by the digital demodulating circuit, the restored DSSS signal; and outputting, by the digital demodulating circuit, the signal to be transmitted. The received DSSS signal is processed by the pre-amplifier circuit, the hysteresis comparing circuit and the digital demodulating circuit sequentially, which is favorable for accurately parsing the received DSSS signal, thereby outputting the signal to be transmitted, to implement accurate signal transmission between the touch screen and the active stylus. In addition, in this embodiment, only one stage of the pre-amplifier circuit, one stage of the hysteresis comparing circuit, and one stage of the digital demodulating circuit are required to implement parsing the received DSSS signal, which renders a simple circuit structure, a small quantity of hardware resources, and relatively low power consumption, and is very applicable to an interactive system of the active stylus and the touch screen that has strict requirements on the circuit size and power consumption, and the like.

For example, demodulating, by the digital demodulating circuit, the restored DSSS signal, includes: sampling, by the digital demodulating circuit, the restored DSSS signal to obtain an original coded signal; performing a bitwise XOR operation on the original coded signal and a preset autocorrelation demodulated signal; and accumulating a result of the bitwise XOR operation to obtain an accumulation result; and demodulating the restored DSSS signal according to the accumulation result.

For example, performing the bitwise XOR operation on the original coded signal and the preset autocorrelation demodulated signal, includes: shifting the autocorrelation demodulated signal as a whole backward by 1 bit after every B bits of the original coded signal are collected, where B is the number of bits of the autocorrelation demodulated signal; performing the bitwise XOR operation on the collected B bits of the original coded signal and the B-bit autocorrelation demodulated signal; accumulating the result of the bitwise XOR operation to obtain an accumulation result, includes: accumulating the result of the bitwise XOR operation on the B bits of the original coded signal and the B-bit autocorrelation demodulated signal to obtain the accumulation result; and demodulating the restored DSSS signal according to the accumulation result, includes: demodulating the restored DSSS signal according to a comparison result between the accumulation result and a preset threshold. The above provides a specific mode of demodulating the restored DSSS signal, and is favorable for effectively demodulating the received DSSS signal.

For example, the original coded signal includes a first type signal, a second type signal and a third type signal. The first type signal is a spread spectrum code corresponding to "0" in the signal to be transmitted, the second type signal is a spread spectrum code corresponding to "1" in the signal to be transmitted, and the third type signal is an unwanted signal. If the autocorrelation demodulated signal is the first type signal, then demodulating the restored DSSS signal according to a comparison result between the accumulation result and a preset threshold, includes: if the accumulation result is detected to be less than or equal to a first preset threshold, identifying the collected B bits of the original coded signal as the first type signal; if the accumulation result is detected to be greater than or equal to a second preset threshold, identifying the collected B bits of original coded signal as the second type signal, where the second preset threshold is greater than the first preset threshold; if the accumulation result is detected to be greater than the first preset threshold and less than the second preset threshold, identifying the collected B bits of the original coded signal as the unwanted signal. The accumulation result of each segment is compared with the first preset threshold and the second preset threshold, which is favorable for accurately parsing the original coded signal, to further implement parsing the completed DSSS signal.

For example, if the accumulation result is detected to be less than or equal to the first preset threshold, the method further includes: using a time at which the collected B bits of the original coded signal starts as a time at which the identified first type signal starts; if the accumulation result is detected to be greater than or equal to the second preset threshold, the method further includes: using a time at which the collected B bits of the original coded signal starts as a time at which the identified second type signal starts. The above is favorable for obtaining a time at which the parsed signal starts, to implement timing synchronization between the screen end and the stylus end.

For example, the first preset threshold is greater than or equal to 0 and less than or equal to $B*N/2$, the second preset threshold is greater than $B*N/2$ and less than or equal to $B*N$, where B is the number of bits of the autocorrelation demodulated signal, and N is a sampling frequency at which the digital demodulating circuit samples the restored DSSS signal. The above provides a mode of setting the first preset threshold and the second preset threshold, so that an accumulation result of each segment of the DSSS signal is compared with the first preset threshold and the second preset threshold set in the above-described mode, each segment of the DSSS signal can be parsed more accurately, to further implement parsing the completed DSSS signal.

For example, the pre-amplifier circuit includes: a non-inverting amplifier circuit or an inverting amplifier circuit. The above provides two implementing modes of the pre-amplifier circuit, so that the implementing modes of this embodiment are flexible and diverse.

For example, the hysteresis comparing circuit includes: a non-inverting hysteresis comparing circuit or an inverting hysteresis comparing circuit. The above provides two implementing modes of the hysteresis comparing circuit, so that the implementing modes of this embodiment are flexible and diverse.

For example, the active stylus includes a main electrode and a secondary electrode, and the coupling capacitor formed between the active stylus and the touch screen includes: a coupling capacitor formed between the main electrode and the touch screen, or a coupling capacitor formed between the secondary electrode and the touch screen, so that the coupling capacitor may be formed between the active stylus and the touch screen in various implementing modes.

BRIEF DESCRIPTION OF THE DRAWINGS

One or more embodiments are exemplarily described through the figures in accompanying drawings corresponding thereto, these exemplary descriptions constitute a limitation to the embodiments. In the drawings, elements having the same reference numerals are denoted as similar elements, and unless otherwise stated, the figures in the accompanying drawings do not constitute a limitation of proportion.

DETAILED DESCRIPTION

In order to make objectives, technical solutions and advantages of the present disclosure more apparent, some embodiments of the present disclosure will be further explained in detail below in combination with accompanying drawings and the embodiments. It should be understood that specific embodiments described herein are merely used for explaining the present disclosure, and not intended to limit the present disclosure.

Figure 1:
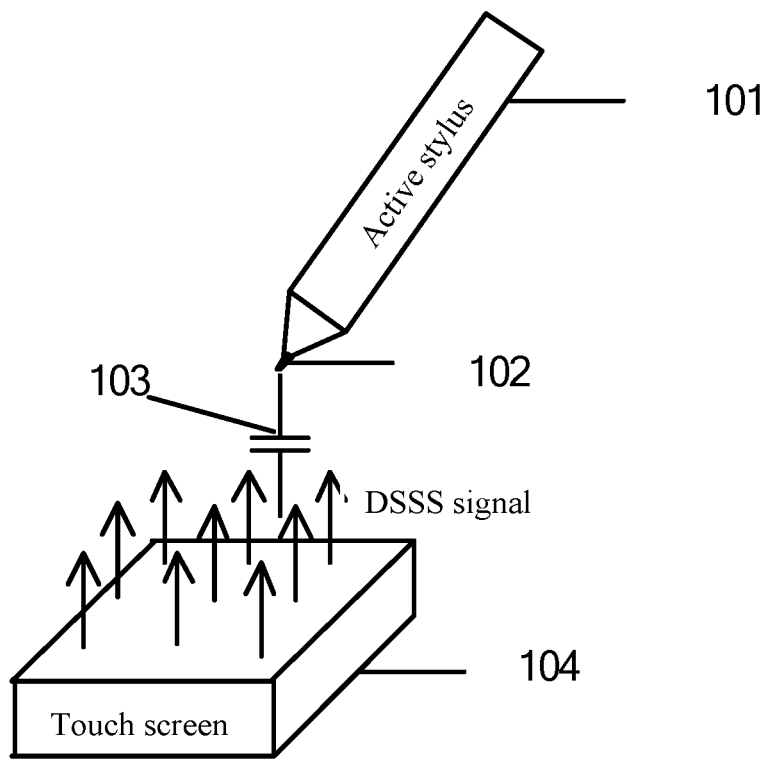
FIG. 1 is a schematic diagram of an application scenario of a method for transmitting a signal according to a first embodiment of the present disclosure.

A first embodiment of the present disclosure relates to a method for transmitting a signal, applied to products such as a mobile phone, a tablet personal computer and a computer which have an active stylus and a touch function. FIG. 1 shows an application scenario of the method for transmitting a signal according to this embodiment. In FIG. 1, a touch screen 104 and an electrode 102 of an active stylus 101 may form a coupling capacitor 103, the touch screen 104 may use a transmitting (TX)/receiving (RX) sensor to send a DSSS signal, and the active stylus 101 uses the coupling capacitor 103 to receive the DSSS signal sent by the touch screen 104, and then parses the DSSS signal, so as to implement information interaction between the active stylus 101 and the touch screen 104.

Figure 2:
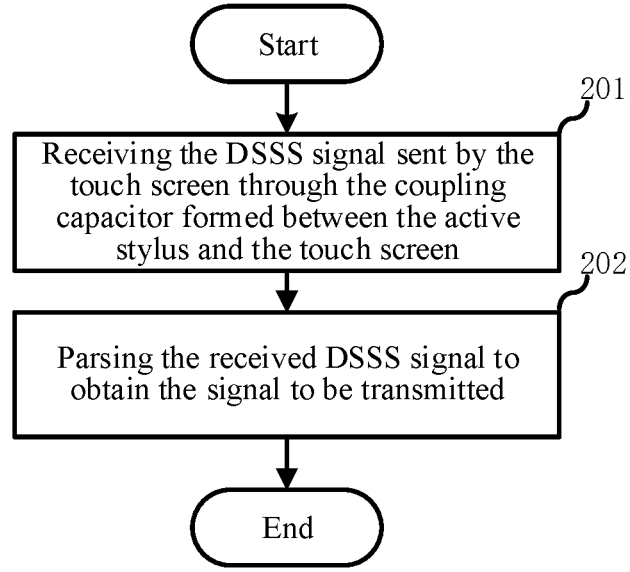
FIG. 2 is a flow chart of the method for transmitting a signal according to the first embodiment of the present disclosure.

A flow chart of the method for transmitting a signal according to this embodiment may be as shown in FIG. 2 and include the following steps.

At step 201, the DSSS signal sent by the touch screen is received through the coupling capacitor formed between the active stylus and the touch screen.

Figure 3:
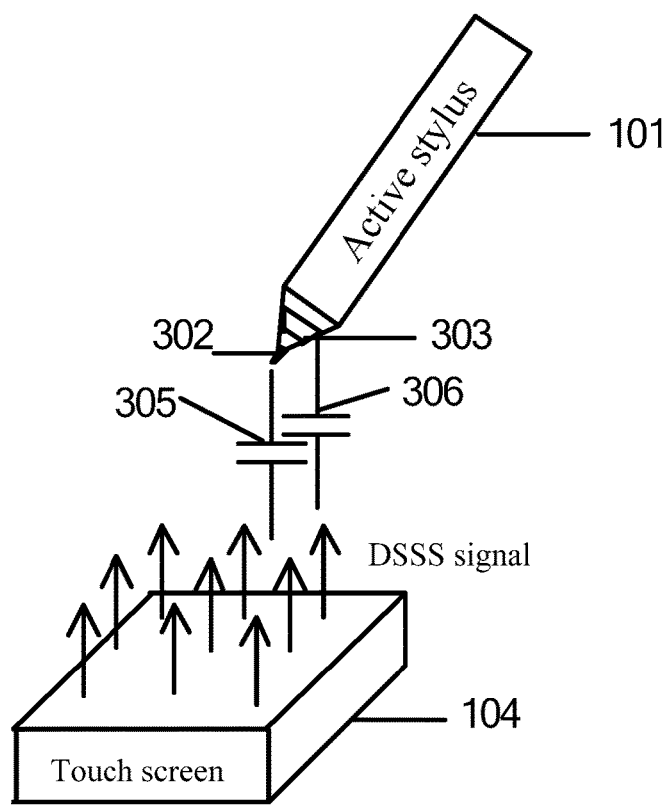
FIG. 3 is a schematic diagram of a coupling capacitor formed between an active stylus and a touch screen according to the first embodiment of the present disclosure.

Specifically, the touch screen may perform spread-spectrum coding on a signal to be transmitted to generate the DSSS signal, the touch screen may use the TX/RX sensor to send the DSSS signal, and the active stylus uses the coupling capacitor to receive the DSSS signal sent by the touch screen. In this embodiment, the coupling capacitor formed between the active stylus and the touch screen may be the coupling capacitor 103 shown in FIG. 1. In an actual application, FIG. 3 also shows a schematic diagram of the coupling capacitor formed between the active stylus and the touch screen. As shown in FIG. 3, the active stylus 101 includes a main electrode 302 and a secondary electrode 303, and the coupling capacitor formed between the active stylus and the touch screen includes: a coupling capacitor 305 formed between the main electrode 302 and the touch screen 104, or a coupling capacitor 306 formed between the secondary electrode 303 and the touch screen 104. The active stylus 101 may receive the DSSS signal through the coupling capacitor 305, or may also receive the DSSS signal through the coupling capacitor 306.

Figure 4:
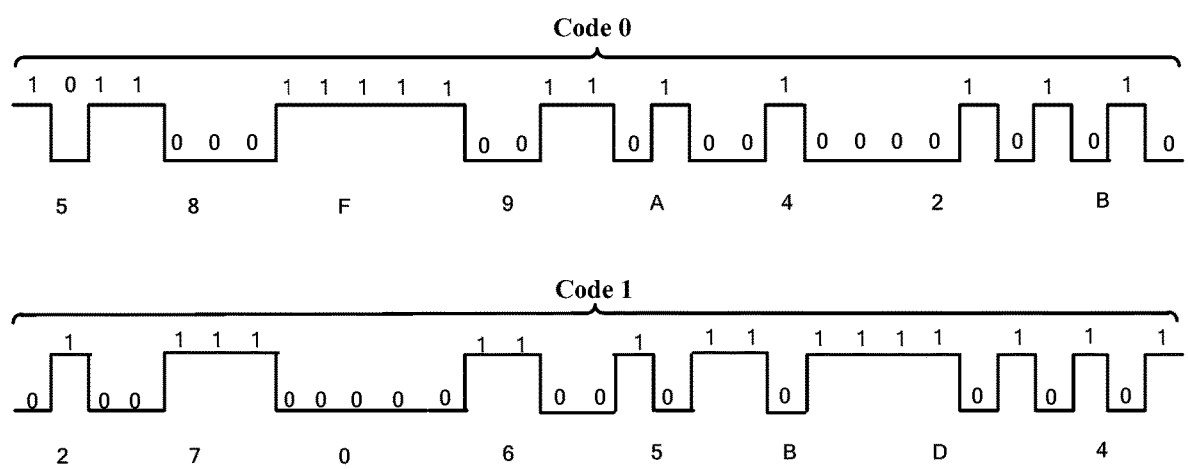
FIG. 4 is a waveform diagram of spread spectrum codes of DSSS signals corresponding to "0" and "1" according to the first embodiment of the present disclosure.

In addition, in this embodiment, when the spread-spectrum coding is performed on the signal to be transmitted, a spread-spectrum coded form of DSSS signals corresponding to "0" and "1" in the USI may be adopted. As shown in FIG. 4, "0" is represented by a 31-bit code 0x58F9A42B, "1" is represented by a 31-bit code 0x27065BD4, and a duration for which each bit lasts is 1 us. This embodiment only takes spread-spectrum coding of DSSS signals in the USI as an example, but is not limited to such type of spread-spectrum coding in the actual application.

At step 202, the received DSSS signal is parsed to obtain the signal to be transmitted.

Figure 5:
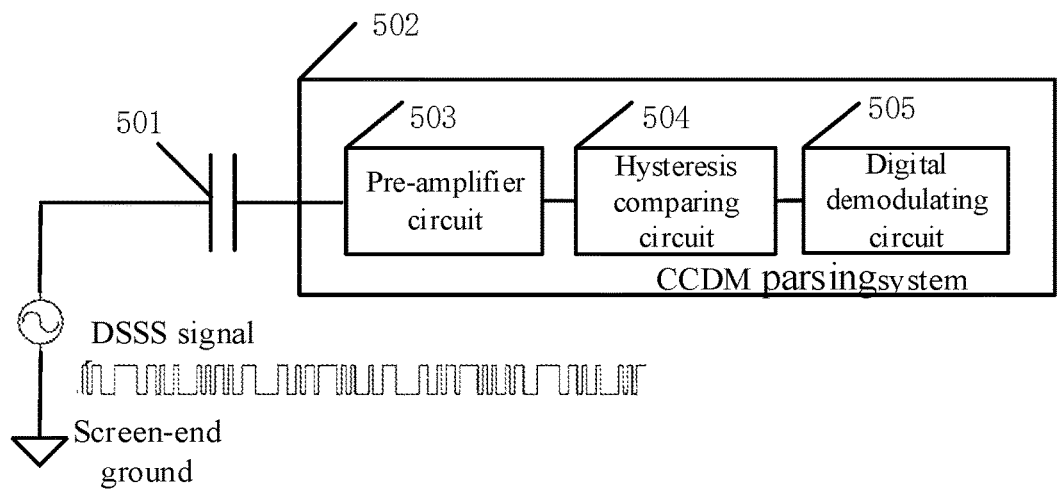
FIG. 5 is a block diagram of implementing step 202 in the method for transmitting a signal according to the first embodiment of the present disclosure.

Specifically, referring to FIG. 5, the DSSS signal received by the active stylus through a coupling capacitor 501 is input to a Comparator Counter DSSS Mixer (CCDM) parsing system 502 in the active stylus, and the CCDM parsing system 502 parses the received DSSS signal to obtain the signal to be transmitted.

The CCDM parsing system 502 includes: a pre-amplifier circuit 503, a hysteresis comparing circuit 504, and a digital demodulating circuit 505. The pre-amplifier circuit 503 pre-amplifies the received DSSS signal, and inputs the pre-amplified DSSS signal into the hysteresis comparing circuit 504. The hysteresis comparing circuit 504 restores the pre-amplified DSSS signal to obtain a restored DSSS signal, and inputs the restored DSSS signal into the digital demodulating circuit 505. The digital demodulating circuit 505 demodulates the restored DSSS signal, and parses out specific coding information of the DSSS signal, that is, the signal to be transmitted.

Figure 6:
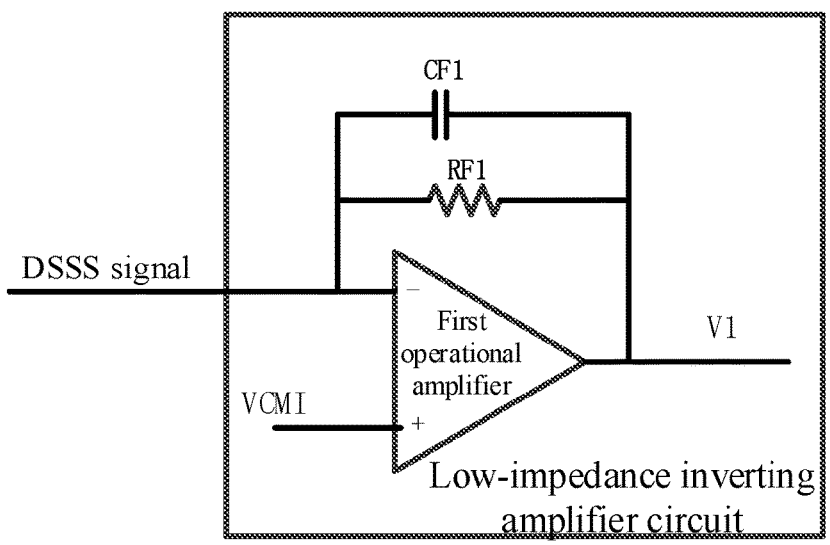
FIG. 6 is a schematic diagram of a low-impedance inverting amplifier circuit according to the first embodiment of the present disclosure.
Figure 7:
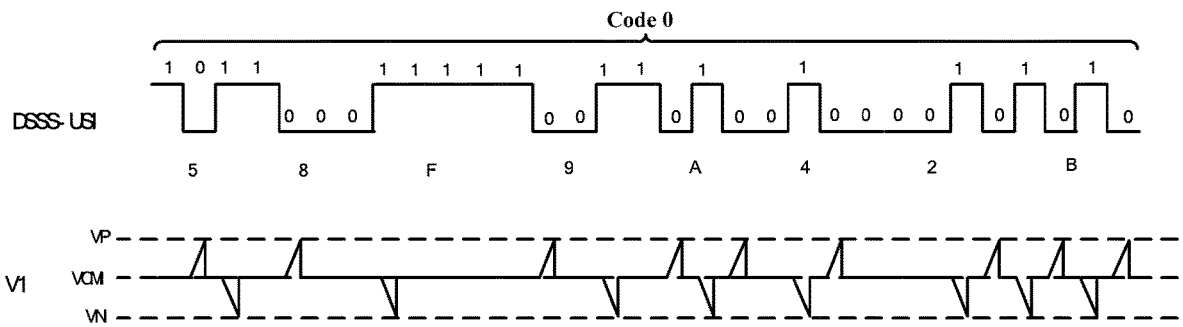
FIG. 7 is a waveform diagram of an input signal and an output signal of the low-impedance inverting amplifier circuit according to the first embodiment of the present disclosure.

In one example, the pre-amplifier circuit 503 may be an Analog Front End (AFE) circuit, and the AFE circuit may be an inverting amplifier circuit, for example, a low-impedance inverting amplifier circuit shown in FIG. 6. The DSSS signal is used as an input signal of an inverting input end of an operational amplifier (OPA) in the low-impedance inverting amplifier circuit. A waveform diagram of the input signal and an output signal of the low-impedance inverting amplifier circuit may be as shown in FIG. 7. The input signal is a DSSS signal coded according to the USI, with code 0 as an example, and the output signal is an inverting amplified signal V1. VP is a positive output amplitude of the inverting amplified signal, VN is a negative output amplitude of the inverting amplified signal, Voltage Common Mode Input (VCMI) is a common mode input voltage, and an output amplitude of the inverting amplified signal may be controlled by configuring parameters of devices such as a resistor and a capacitor in the diagram.

Figure 8:
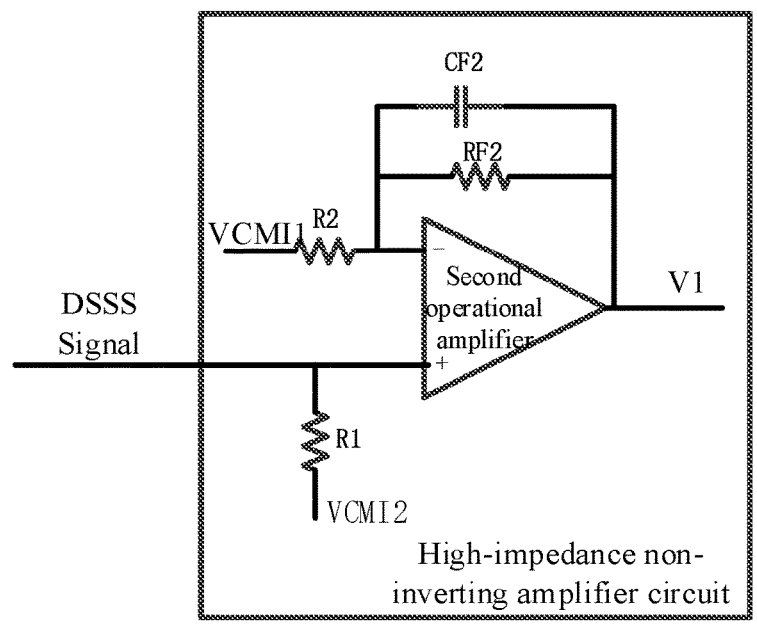
FIG. 8 is a schematic diagram of a high-impedance non-inverting amplifier circuit according to the first embodiment of the present disclosure.
Figure 9:
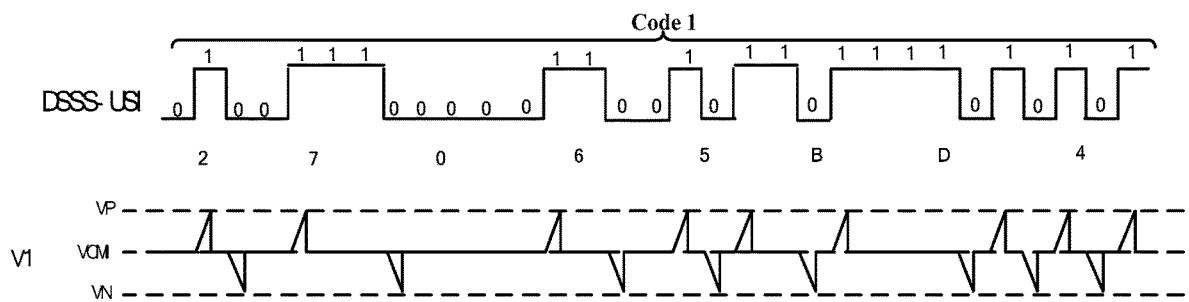
FIG. 9 is a waveform diagram of an input signal and an output signal of the high-impedance non-inverting amplifier circuit according to the first embodiment of the present disclosure.

In another example, the AFE circuit may be a non-inverting amplifier circuit, for example, a high-impedance non-inverting amplifier circuit as shown in FIG. 8. The DSSS signal is used as an input signal of a non-inverting input end of an OPA in the high-impedance non-inverting amplifier circuit. A waveform diagram of the input signal and an output signal of the high-impedance non-inverting amplifier circuit may be as shown in FIG. 9. The input signal is a DSSS signal coded according to the USI protocol, with code 1 as an example, and the output signal is a non-inverting amplified signal V1, and an output amplitude of the inverting amplified signal may be controlled by configuring parameters of devices such as a resistor and a capacitor in the diagram.

Further, the hysteresis comparing circuit 504 may be a non-inverting hysteresis comparing circuit or an inverting hysteresis comparing circuit, and the hysteresis comparing circuit 504 will be specifically described below with two examples.

Figure 10:
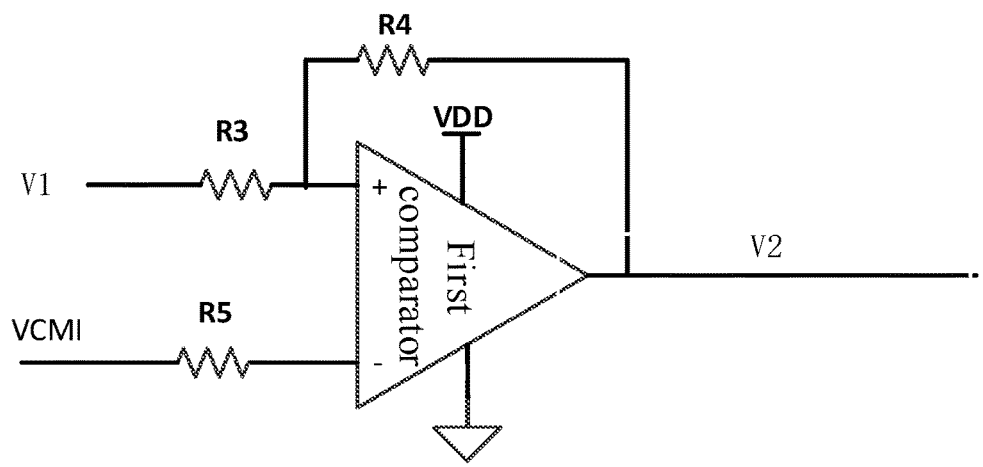
FIG. 10 is a schematic diagram of a non-inverting hysteresis comparing circuit according to the first embodiment of the present disclosure.
Figure 11:
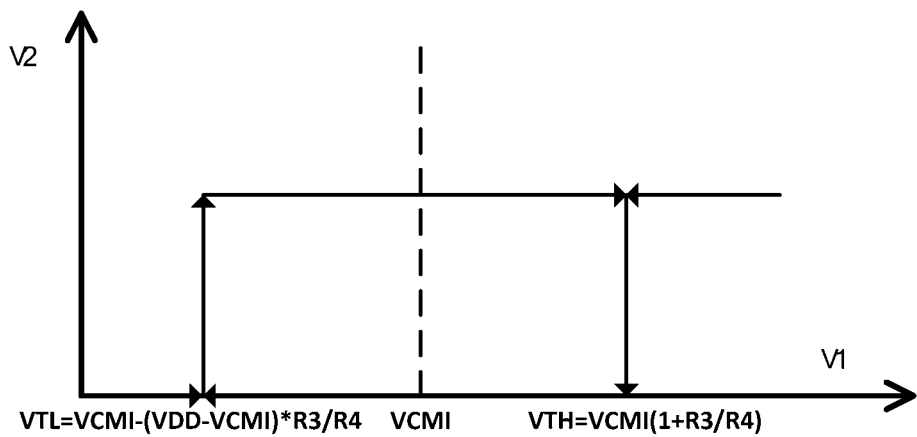
FIG. 11 is a waveform diagram of an input signal and an output signal of the non-inverting hysteresis comparing circuit according to the first embodiment of the present disclosure.

In one example, the hysteresis comparing circuit 504 may be a non-inverting hysteresis comparing circuit in FIG. 10. The non-inverting hysteresis comparing circuit may restore the pre-amplified signal to an original DSSS signal. V1, as the output signal of the AFE circuit, is used as an input signal of a non-inverting end of a comparator in the hysteresis comparing circuit 504, and V2 is an output signal of the hysteresis comparing circuit. A waveform diagram of the input signal and an output signal of the non-inverting hysteresis comparing circuit may be as shown in FIG. 11, where VTH and VTL are two transition levels, specifically, VTL=VCMI−(VDD−VCMI)*R3/R4, and VTH=VCMI(1+R3/R4), and VTH and VTL may be adjusted by adjusting magnitudes of R3 and R4.

Figure 12:
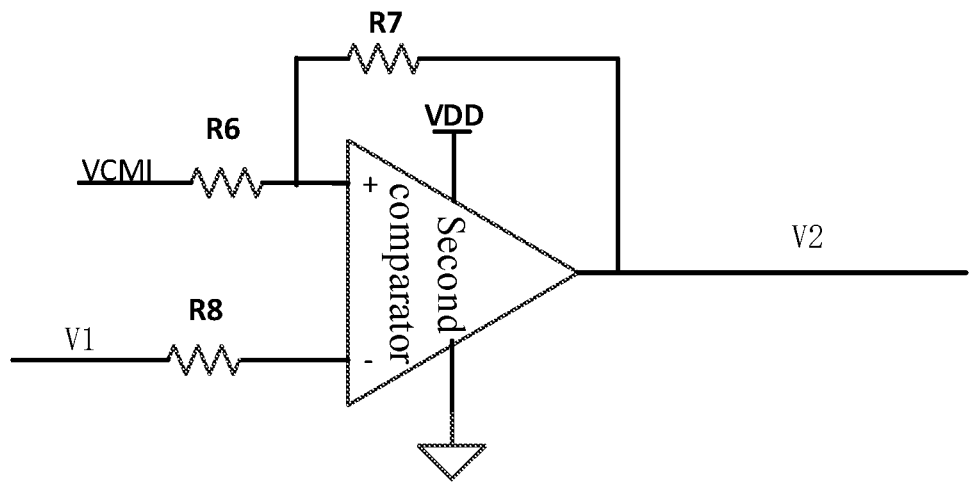
FIG. 12 is a schematic diagram of an inverting hysteresis comparing circuit according to the first embodiment of the present disclosure.
Figure 13:
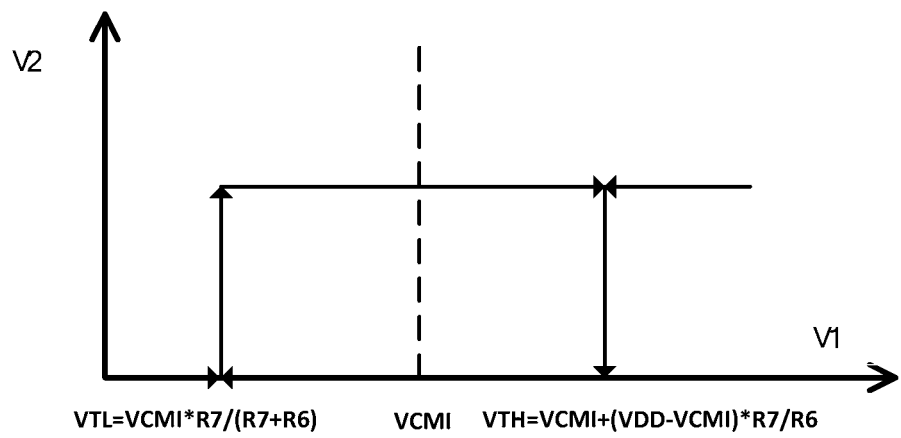
FIG. 13 is a waveform diagram of an input signal and an output signal of the inverting hysteresis comparing circuit according to the first embodiment of the present disclosure.

In another example, the hysteresis comparing circuit 504 may also be an inverting hysteresis comparing circuit in FIG. 12. The inverting hysteresis comparing circuit may restore the pre-amplified signal to an inverting signal of the original DSSS signal. V1, as the output signal of the AFE circuit, is used as an input signal of an inverting end of a comparator in the hysteresis comparing circuit 504. A waveform diagram of the input signal and an output signal of the inverting hysteresis comparing circuit may be as shown in FIG. 13, where VTL=VCMI*R7/(R7+R6), and VTH=VCMI+(VDD−VCMI)*R7/R6.

In the actual application, the pre-amplifier circuit 503 and the hysteresis comparing circuit 504 may be combined in various modes, for example, the modes of combining the pre-amplifier circuit 503 and the hysteresis comparing circuit 504 may be: combining a high-impedance non-inverting amplifier circuit and a non-inverting hysteresis comparing circuit, combining a high-impedance non-inverting amplifier circuit and an inverting hysteresis comparing circuit, combining a low-impedance inverting amplifier circuit and a non-inverting hysteresis comparing circuit, and combining a low-impedance inverting amplifier circuit and an inverting hysteresis comparing circuit. Any combination of the pre-amplifier circuit 503 and the hysteresis comparing circuit 504 may restore the original DSSS signal to the non-inverting signal or an inverting signal of the original DSSS signal, for example, if several-bit codes of the original signal are "01101", the restored code is still "01101" for the so-called non-inverting signal, and the restored inverted code is "10010" for the so-called inverting signal. Regardless of whether a non-inverting signal or an inverting signal is restored, the digital demodulating circuit 505 can carry out demodulating the restored signal, and if the restored signal is an inverting signal, the original signal can be obtained only by adding an inverting function to the digital demodulating circuit 505.

Figure 14:
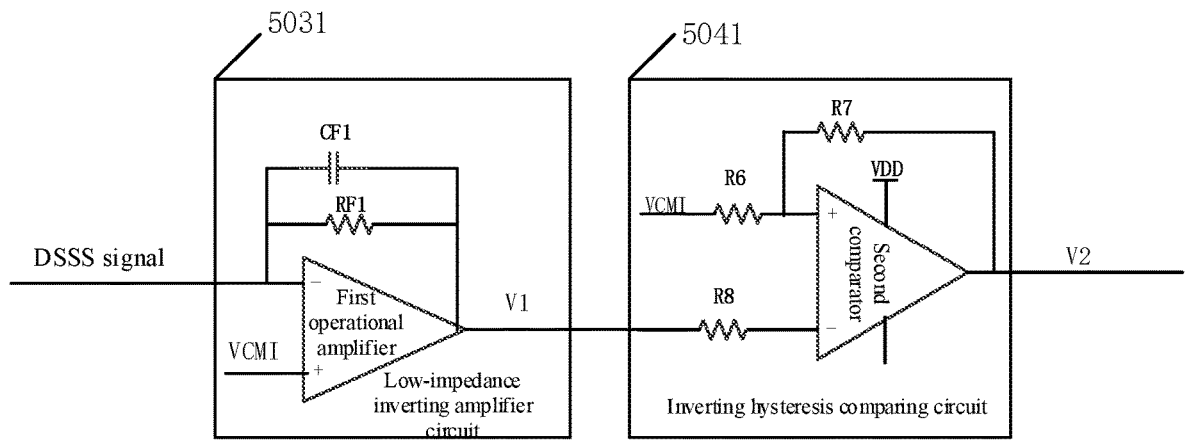
FIG. 14 is a schematic diagram of a circuit combining the low-impedance inverting amplifier circuit and the inverting hysteresis comparing circuit according to the first embodiment of the present disclosure.
Figure 15:
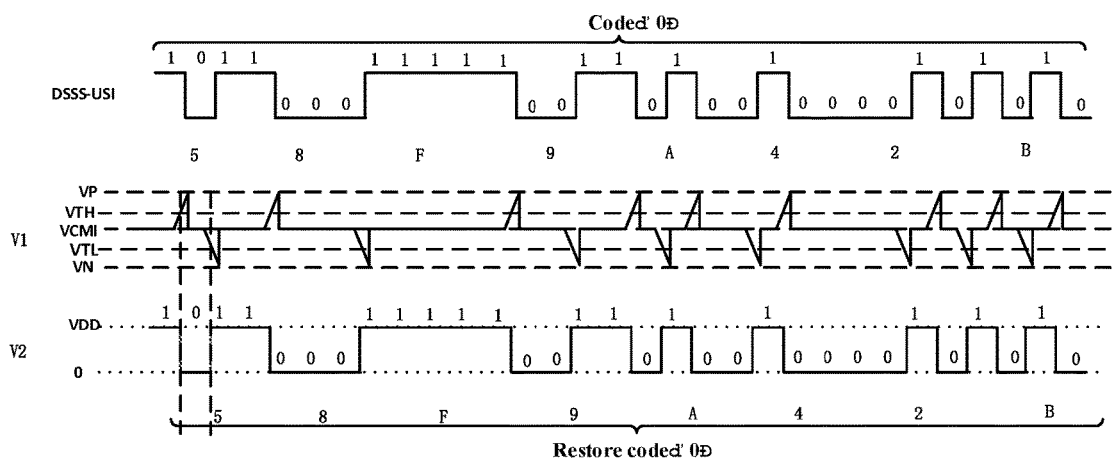
FIG. 15 is a waveform diagram of an input signal and an output signal of a circuit combining the low-impedance inverting amplifier circuit and the inverting hysteresis comparing circuit according to the first embodiment of the present disclosure.

In one example, the mode of combining the pre-amplifier circuit 503 and the hysteresis comparing circuit 504 is: combining a low-impedance inverting amplifier circuit 5031 and an inverting hysteresis comparing circuit 5041. Referring to FIG. 14, the DSSS signal received through the coupling capacitor formed between the active stylus and the touch screen is input into an inverting input end of an OPA in the low-impedance inverting amplifier circuit 5031, and an output signal V1 of the OPA is input into an inverting input end of the inverting hysteresis comparing circuit 5041. Further, a waveform diagram of an inverting input signal (that is, the DSSS signal) and an output signal V1 of the low-impedance inverting amplifier circuit 5031, and an output signal V2 of the inverting hysteresis comparing circuit 5041 is as shown in FIG. 15, where the DSSS signal takes a DSSS code in the USI protocol as an example, and the DSSS code in FIG. 15 takes a 31-bit code 0x58F9A42B of the code "0" as an example, which, however, is not limited thereto in the actual application. As can be seen from FIG. 15, a combination of the low-impedance inverting amplifier circuit 5031 and the inverting hysteresis comparing circuit 5041 may pre-amplify the original DSSS signal and restore the pre-amplified DSSS signal to a non-inverting signal of the original DSSS signal.

Figure 16:
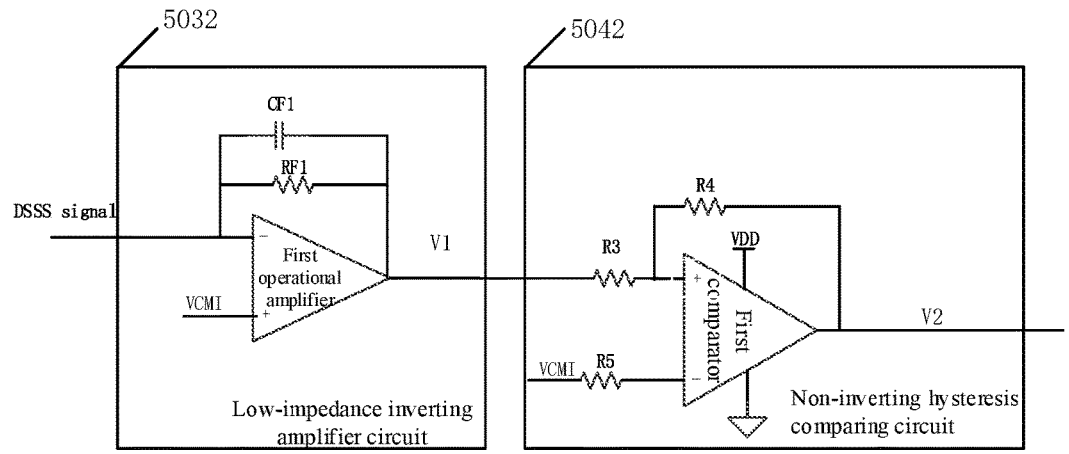
FIG. 16 is a schematic diagram of a circuit combining the low-impedance inverting amplifier circuit and the non-inverting hysteresis comparing circuit according to the first embodiment of the present disclosure.
Figure 17:
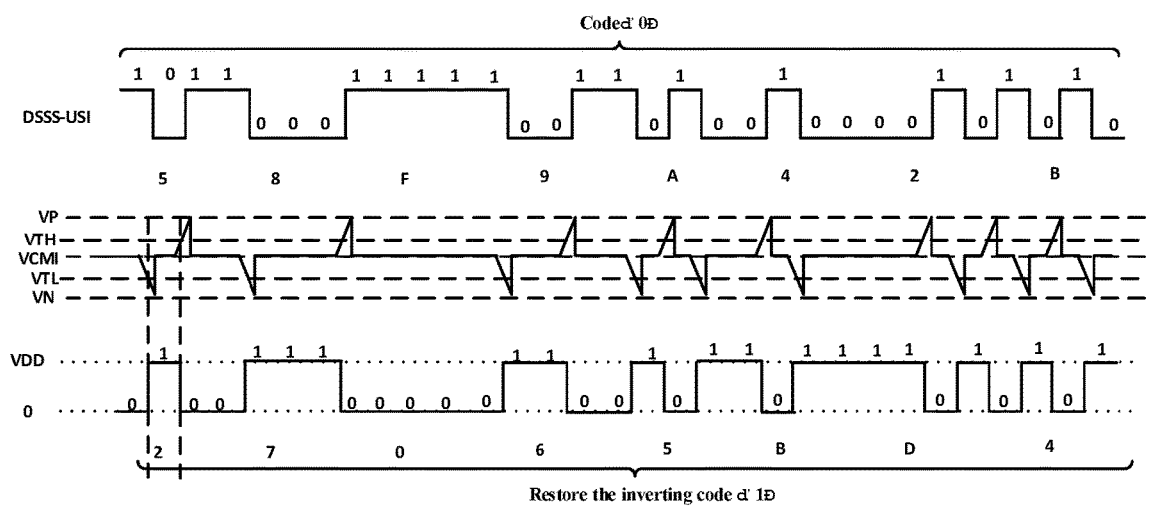
FIG. 17 is a waveform diagram of an input signal and an output signal of a circuit combining the low-impedance inverting amplifier circuit and the non-inverting hysteresis comparing circuit according to the first embodiment of the present disclosure.

In another example, the mode of combining the pre-amplifier circuit 503 and the hysteresis comparing circuit 504 is: combining a low-impedance inverting amplifier circuit 5032 and a non-inverting hysteresis comparing circuit 5042. Referring to FIG. 16, a DSSS signal is input into an inverting input end of an OPA in the low-impedance inverting amplifier circuit 5032, and an output signal V1 of the OPA is input into a non-inverting input end of the non-inverting hysteresis comparing circuit 5042. Further, a waveform diagram of an inverting input signal (that is, the DSSS signal) and the output signal V1 of the low-impedance inverting amplifier circuit 5032, and an output signal V2 of the non-inverting hysteresis comparing circuit 5042 is as shown in FIG. 17, where the DSSS signal takes a DSSS code in the USI protocol as an example, and the DSSS code in FIG. 17 takes a 31-bit code 0x58F9A42B of the code "0" as an example, which, however, is not limited thereto in the actual application. As can be seen from FIG. 17, a combination of the low-impedance inverting amplifier circuit 5032 and the non-inverting hysteresis comparing circuit 5042 may pre-amplify the original DSSS signal and restore the pre-amplified DSSS signal to an inverting signal of the original DSSS signal.

Finally, the signal V2 output from the hysteresis comparing circuit 504 is input into the digital demodulating circuit 505, and the digital demodulating circuit 505 demodulates the signal V2 to obtain a signal to be transmitted, thereby implementing information interaction between the touch screen and the active stylus.

Figure 18:
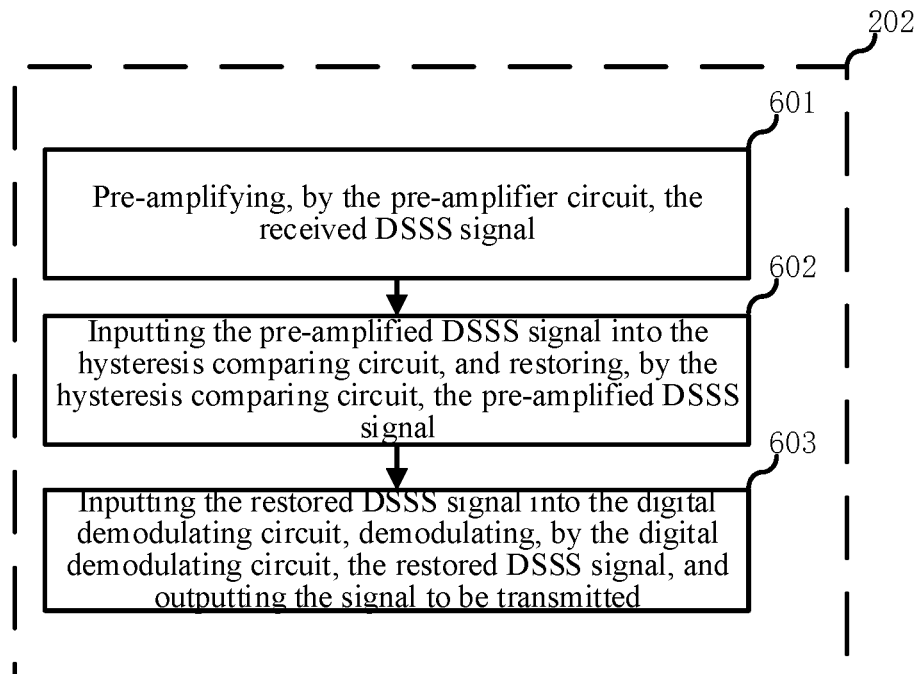
FIG. 18 is a flow chart of an implementation process of step 202 according to the first embodiment of the present disclosure.

To further facilitate understanding, an implementation process of step 202 may refer to FIG. 18, which includes the following steps.

At step 601, the pre-amplifier circuit pre-amplifies the received DSSS signal.

At step 602, the pre-amplified DSSS signal is input into the hysteresis comparing circuit, and the hysteresis comparing circuit restores the pre-amplified DSSS signal to obtain the restored DSSS signal.

At step 603, the restored DSSS signal is input into the digital demodulating circuit, and the digital demodulating circuit demodulates the restored DSSS signal and outputs the signal to be transmitted.

The above-described step 601 to step 603 have been described above, and no details will be repeated here.

Compared with existing technologies, the DSSS signal sent by the touch screen is received through the coupling capacitor formed between the active stylus and the touch screen in this embodiment, where the DSSS signal is a spread-spectrum coded signal to be transmitted, and the active stylus parses the received DSSS signal to obtain the signal to be transmitted. The DSSS signal is received through capacitive coupling, which can be well applied to DSSS signal transmission in a touch system. In addition, in this embodiment, only one stage of the pre-amplifier circuit, one stage of the hysteresis comparing circuit, and one stage of the digital demodulating circuit are required to perform parsing the received DSSS signal, which renders a simple circuit structure, a small quantity of hardware resources, and relatively low power consumption, and is very applicable to an interactive system of the active stylus and the touch screen that has strict requirements on a circuit size and power consumption, and the like.

Figure 19:
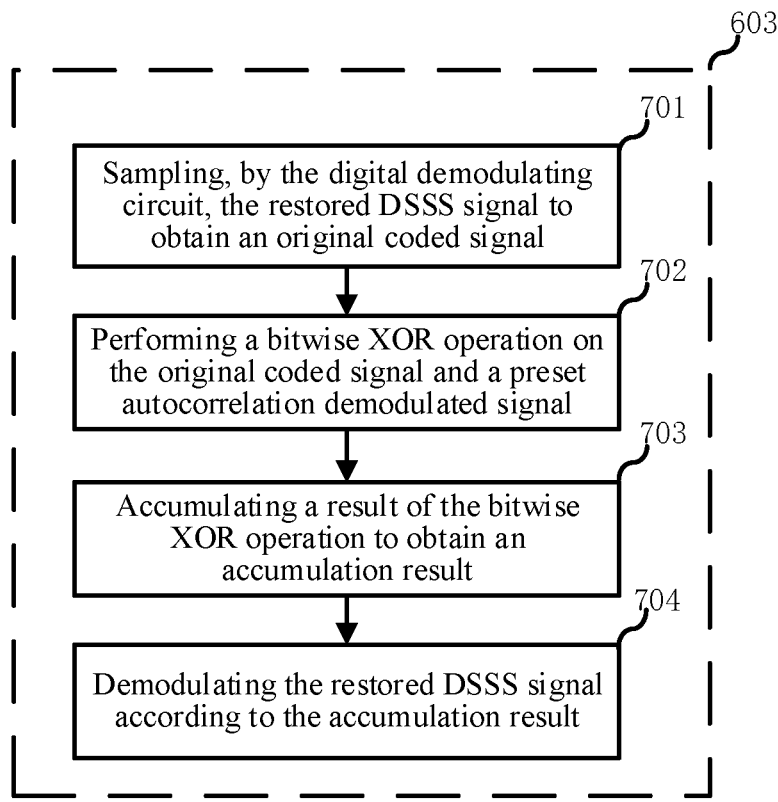
FIG. 19 is a flow chart of an implementation process of step 603 according to a second embodiment of the present disclosure.

A second embodiment of the present disclosure relates to a method for transmitting a signal. This embodiment mainly describes an implementation process of step 603 in the first embodiment in detail, that is to say, specifically describes how to demodulate the restored DSSS signal by the digital demodulating circuit. The digital demodulating circuit may adopt a corresponding algorithm to implement a corresponding function thereof. Please refer to FIG. 19, which shows a flow chart of a specific algorithm, including the following steps.

At step 701, the digital demodulating circuit samples the restored DSSS signal to obtain an original coded signal.

In this embodiment, the USI is taken as an example for description, specifically, a restored DSSS signal output by a hysteresis comparing circuit may be sampled at a sampling frequency of N Mhz to obtain an original coded signal 1. The original coded signal 1 includes a first type signal, a second type signal and a third type signal, where the first type signal is a spread spectrum code 0x58F9A428 corresponding to "0" in a signal to be transmitted, the second type signal is a spread spectrum code 0x27065BD4 corresponding to "1" in the signal to be transmitted, and the third type signal is an unwanted signal.

At step 702, a bitwise XOR operation is performed on the original coded signal and a preset autocorrelation demodulated signal.

Figure 20:
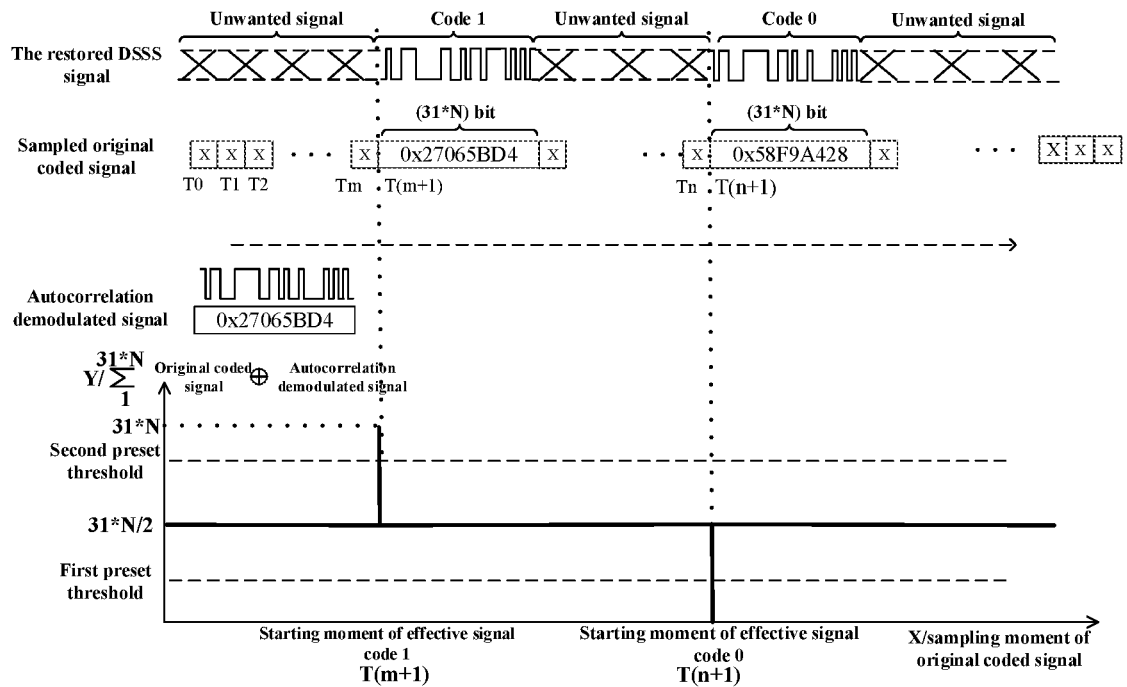
FIG. 20 is a schematic diagram of identifying an effective signal code by accumulating a result of the bitwise XOR operation on an original coded signal 1 and an autocorrelation demodulated signal 2 according to the second embodiment of the present disclosure.

Specifically, after every B bits of the original coded signal are collected, the autocorrelation demodulated signal is shifted as a whole backward by 1 bit, where B is the number of bits of the autocorrelation demodulated signal, that is, the autocorrelation demodulated signal 2 is shifted as a whole on a time axis, so that all the collected B bits of the original coded signal may be subjected to a bitwise XOR operation with the corresponding autocorrelation demodulated signal. The autocorrelation demodulated signal may be a first type signal or a second type signal, the autocorrelation demodulated signal takes the first type signal as an example in this embodiment, and as shown in FIG. 20, a waveform diagram of the autocorrelation demodulated signal 2 is a waveform diagram of "code 0". According to characteristics of the DSSS signals in the USI protocol, "0" or "1" is coded with 31-bit data, and a duration at which each bit lasts is 1 us, then the number of points obtained by sampling each bit is N, so the autocorrelation demodulated signal 2 is stored in a 31*N wave table. As each sampling point is collected, the autocorrelation demodulated signal 2 is shifted bitwise, and the above-described bitwise XOR operation performed on the original coded signal 1 and the autocorrelation demodulated signal 2 is repeated.

At step 703, a result of the bitwise XOR operation is accumulated to obtain an accumulation result.

Specifically, the bitwise XOR result of the collected B bits of the original coded signal and the B-bit autocorrelation demodulated signal are accumulated to obtain the accumulation result. Usually, when a synchronous XOR operation is performed on a segment of code "1" in signal 1 and an autocorrelation demodulated signal 2, an obtained accumulation result is close to 31*N. When a synchronous XOR operation is performed on a segment of code "0" in the original coded signal 1 and the autocorrelation demodulated signal 2, an obtained accumulation result is close to 0. When an XOR operation is performed on the unwanted signal in the original coded signal 1 and the autocorrelation demodulated signal 2, an obtained accumulation result is close to 31*N/2.

At step 704, the restored DSSS signal is demodulated according to the accumulation result.

Specifically, the restored DSSS signal may be demodulated according to a comparison result between the accumulation result and respective preset thresholds. The preset thresholds may include a first preset threshold and a second preset threshold, where the second preset threshold is greater than the first preset threshold. In the actual application, the first preset threshold Threshold_L may be a natural number greater than or equal to 0, and less than or equal to B*N/2, that is, 0≤Threshold_L≤B*N/2. The second preset threshold Threshold_H may be a natural number greater than B*N/2, and less than or equal to B*N, that is, B*N/2<Threshold_H≤B*N, where B is the number of bits of the autocorrelation demodulated signal. Since the autocorrelation demodulated signal according to this embodiment takes a 31-bit data code as an example, in this embodiment, B is 31, where N is a sampling frequency at which the digital demodulating circuit samples the restored DSSS signal. In other words, in this embodiment, 0≤Threshold_L≤31*N/2, and 31*N/2<Threshold_H≤31*N.

Further, if the accumulation result is detected to be less than or equal to Threshold_L, then the B bits of the original coded signal is identified as the first type signal. If the accumulation result is detected to be greater than or equal to Threshold_H, then the B bits of the original coded signal is identified as the second type signal. If the accumulation result is detected to be greater than Threshold_L and less than Threshold_H, then the B bits of the original coded signal is identified as the unwanted signal. To facilitate understanding, please refer to FIG. 20, if the accumulation result is greater than Threshold_H, code 1 may be identified, if the accumulation result is less than Threshold_L, code 0 may be identified, and if the accumulation result is less than Threshold_H and greater than Threshold_L, the unwanted signal may be identified. As can be seen from FIG. 20, the unwanted signals are sampled at moments T0, T1, T2, Tm and Tn, code 1 is sampled when the moment Tm+1 starts, and code 0 is sampled when the moment Tn+1 starts.

In the actual application, if the accumulation result is detected to be less than or equal to the first preset threshold, then a time at which the collected B bits of the original coded signal starts may also be used as a time at which the identified first type signal starts. If the detected accumulation result is greater than or equal to the second preset threshold, then the time at which the collected B bits of the original coded signal starts may also be used as a time at which the identified second type signal starts. To facilitate understanding, please refer to FIG. 20, if the accumulation result is greater than Threshold_H, a code 1 may be identified, and it can be known that a time at which the code "1" starts is a time at which the collected segment of the original coded signal starts, for example, "an effective signal code 1 starts at the moment Tm+1" marked in the diagram. If the accumulation result is less than Threshold_L, a code 0 may be identified, and it can be known that a time at which the code "0" starts is a time at which the collected segment of the original coded signal starts, for example "an effective signal code 0 starts at the moment Tn+1" marked in the diagram.

Compared with existing technologies, the digital demodulating circuit may demodulate the DSSS signal restored by the hysteresis comparing circuit in this embodiment, detect when the DSSS signal starts, to implement timing synchronization between the touch screen and the active stylus according to the DSSS signal, for better information interaction between the touch screen and the active stylus.

Figure 21:
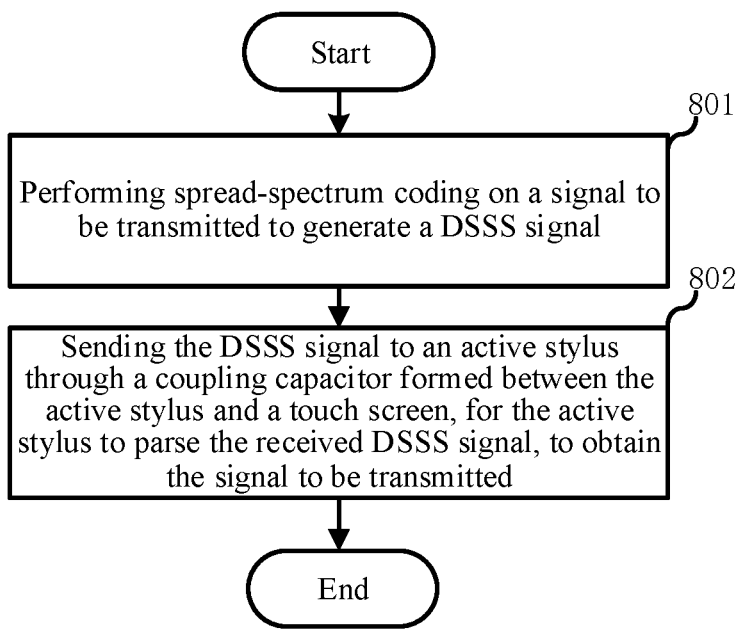
FIG. 21 is a flow chart of a method for transmitting a signal according to a third embodiment of the present disclosure.

A third embodiment of the present disclosure relates to a method for transmitting a signal, applied to a touch screen. A specific flow chart is as shown in FIG. 21, which includes the following steps.

At step 801, spread-spectrum coding is performed on a signal to be transmitted to generate a DSSS signal.

At step 802, the DSSS signal is sent to an active stylus through a coupling capacitor formed between the active stylus and a touch screen, for the active stylus to parse the received DSSS signal, to obtain the signal to be transmitted.

It is not difficult to find that, the method for transmitting a signal according to this embodiment is applied to the touch screen, the method for transmitting a signal according to the first embodiment and the second embodiment are applied to the active stylus, so this embodiment may be implemented in cooperation with the first embodiment and the second embodiment. The related technical details as mentioned in the first embodiment and the second embodiment are still valid in this embodiment, and in order to reduce repetition, no details will be repeated here. Correspondingly, the related technical details as mentioned in this embodiment may also be applied to the first embodiment and the second embodiment.

Compared with existing technologies, the DSSS signal is transmitted through the coupling capacitor formed between the active stylus and the touch screen, which can be well applied to DSSS signal transmission in a touch system in this embodiment. In addition, in this embodiment, only one stage of the pre-amplifier circuit, one stage of the hysteresis comparing circuit, and one stage of the digital demodulating circuit are required to implement parsing the received DSSS signal, which renders a simple circuit structure, a small quantity of hardware resources, and relatively low power consumption, and is very applicable to an interactive system of the active stylus and the touch screen that has strict requirements on a circuit size and power consumption, and the like.

The steps of the above various methods are divided only for clarity of description, the steps, when performed, may be merged into one step or some steps may be split into a plurality of steps, which are all within the protection scope of this patent as long as they include the same logical relationship. Additions of insignificant modifications or introductions of insignificant design to algorithms or processes without changing a core design of the algorithms and processes, are all within the protection scope of this patent.

Figure 22:
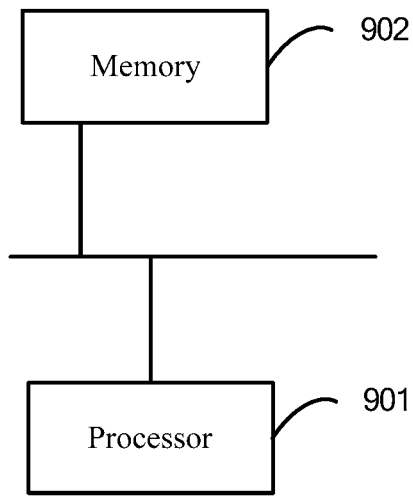
FIG. 22 is a structural schematic diagram of an active stylus according to a fourth embodiment of the present disclosure.

A fourth embodiment of the present disclosure relates to an active stylus, as shown in FIG. 22, which includes: at least one processor 901, and a memory 902 connected and in communication with the at least one processor 901, where the memory 902 stores instructions executable by the at least one processor 901, and the instructions, when executed by the at least one processor 901, cause the at least one processor 901 to perform the above-described method for transmitting a signal applied to the active stylus.

The memory 902 and the processor 901 are connected with each other by means of a bus, the bus may include any number of interconnected buses and bridges, and the bus connects together various circuits of one or more processors and the memory 902. The bus may also connect together various other circuits such as peripheral devices, voltage regulators and power management circuits, which are all well known in the art, and thus, will not be described further herein. A bus interface provides an interface between the bus and a transceiver. The transceiver may be a single element, or may also be a plurality of elements, such as a plurality of receivers and transmitters, which provides a unit for communicating with various other apparatuses over a transmission medium. Data processed by the processor 901 is transmitted on a wireless medium through an antenna, and further, the antenna also receives the data from the processor 901 and transmits the data to the processor 901.

The processor 901 is responsible for managing the bus and general processing, and may further provide various functions, including timing, peripheral interfaces, voltage regulation, power management, and other control functions. The memory 902 may be configured to store data used by the processor 901 when the processor 901 executes operations.

Figure 23:
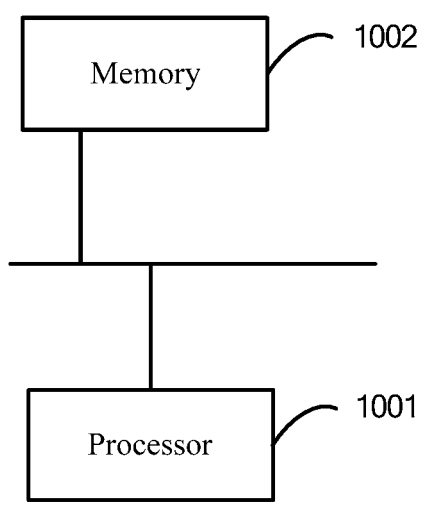
FIG. 23 is a structural schematic diagram of a touch screen according to a fifth embodiment of the present disclosure.

A fifth embodiment of the present disclosure relates to a touch screen, as shown in FIG. 23, including: at least one processor 1001, and a memory 1002 connected and in communication with the at least one processor 1001, where the memory 1002 stores instructions executable by the at least one processor 1001, the instructions, when executed by the at least one processor 1001, causes the at least one processor 1001 to perform the above-described method for transmitting a signal applied to the touch screen.

The memory 1002 and the processor 1001 are connected with each other by means of a bus, the bus may include any number of interconnected buses and bridges, and the bus connects together various circuits of one or more processors and the memory 1002. The bus may also connect together various other circuits such as peripheral devices, voltage regulators and power management circuits, which are all well known in the art, and thus, will not be described further herein. A bus interface provides an interface between the bus and a transceiver. The transceiver may be a single element, or may also be a plurality of elements, such as a plurality of receivers and transmitters, which provides a unit for communicating with various other apparatuses over a transmission medium. Data processed by the processor 1001 is transmitted on a wireless medium through an antenna, and further, the antenna also receives the data from the processor 1001 and transmits the data to the processor 1001.

The processor 1001 is responsible for managing the bus and general processing, and may further provide various functions, including timing, peripheral interfaces, voltage regulation, power management, and other control functions. The memory 1002 may be configured to store data used by the processor 1001 when the processor 1001 executes operations.

Figure 24:
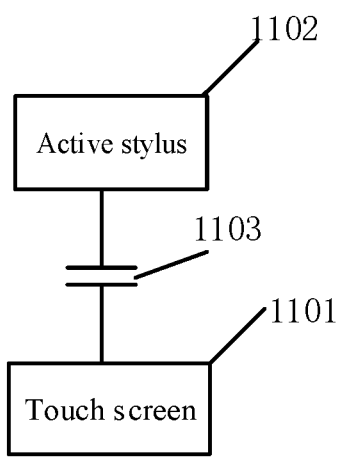
FIG. 24 is a schematic diagram of a system for transmitting a signal according to a sixth embodiment of the present disclosure.

A sixth embodiment of the present disclosure relates to a system for transmitting a signal, as shown in FIG. 24, including: a touch screen 1101 and an active stylus 1102. The touch screen 1101 is configured to perform spread-spectrum coding on a signal to be transmitted to generate a DSSS signal. The touch screen 1101 is further configured to send the DSSS signal to the active stylus 1102 through a coupling capacitor 1103 formed between the touch screen 1101 and the active stylus 1102. The active stylus 1102 is configured to parse the received DSSS signal to obtain the signal to be transmitted.

It is not difficult to find that, this embodiment is a system embodiment corresponding to the first embodiment, the second embodiment and the third embodiment, and this embodiment may be implemented in cooperation with the first embodiment, the second embodiment and the third embodiment. The related technical details as mentioned in the first embodiment, the second embodiment and the third embodiment are still valid in this embodiment, and in order to reduce repetition, no details will be repeated here. Correspondingly, the related technical details as mentioned in this embodiment may also be applied to the first embodiment, the second embodiment and the third embodiment.

Compared with existing technologies, the DSSS signal is transmitted through the coupling capacitor formed between the active stylus and the touch screen in this embodiment, which can be well applied to DSSS signal transmission in a touch system. In addition, in this embodiment, only one stage of the pre-amplifier circuit, one stage of the hysteresis comparing circuit, and one stage of the digital demodulating circuit are required in the active stylus to implement parsing the received DSSS signal, which renders a simple circuit structure, a small quantity of hardware resources, and relatively low power consumption, and is very applicable to the interactive system of the active stylus and the touch screen that has strict requirements on a circuit size and power consumption, and the like.

Figure 25:
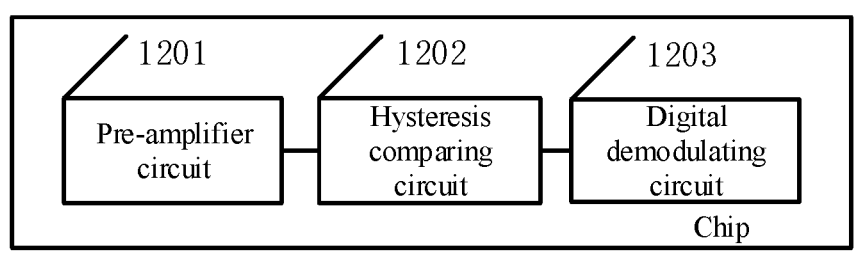
FIG. 25 is a schematic diagram of a chip according to a seventh embodiment of the present disclosure.

A seventh embodiment of the present disclosure relates to a chip, as shown in FIG. 25, including: a pre-amplifier circuit 1201, configured to pre-amplify a DSSS signal sent by a touch screen and received through a coupling capacitor formed between an active stylus and the touch screen, and output the pre-amplified DSSS signal to a hysteresis comparing circuit 1202; the hysteresis comparing circuit 1202, configured to restore the pre-amplified DSSS signal to obtain the restored DSSS signal and output the restored DSSS signal to a digital demodulating circuit 1203; and the digital demodulating circuit 1203, configured to demodulate the restored DSSS signal.

In one example, the pre-amplifier circuit 1201 may include an inverting amplifier circuit or a non-inverting amplifier circuit, and the hysteresis comparing circuit may include: a non-inverting hysteresis comparing circuit or an inverting hysteresis comparing circuit.

In one example, the inverting amplifier circuit may be a low-impedance inverting amplifier circuit as shown in FIG. 6. The low-impedance inverting amplifier circuit includes: a first operational amplifier, a first feedback resistor RF1 and a first feedback capacitor CF1, where the first operational amplifier has a non-inverting input end connected with an input voltage VCMI, and an inverting input end connected with the DSSS signal. The first feedback resistor RF1 is bridged between the inverting input end and an output end of the first operational amplifier, and the first feedback capacitor CF1 is connected in parallel with the first feedback resistor RF1. That is to say, the first feedback resistor RF1 has a first end connected with the inverting input end of the first operational amplifier, and a second end connected with the output end of the first operational amplifier. The first feedback capacitor CF1 has a first end connected with the first end of the first feedback resistor RF1, and a second end connected with the second end of the first feedback resistor RF1.

In one example, the non-inverting amplifier circuit may be a high-impedance non-inverting amplifier circuit as shown in FIG. 8. The high-impedance non-inverting amplifier circuit includes: a second operational amplifier, a second feedback resistor RF2, a second feedback capacitor CF2, a first resistor R1 and a second resistor R2, where the second operational amplifier has a non-inverting input end connected with the DSSS signal, and an inverting input end connected with a second end of the second resistor R2, and a first end of the second resistor R2 is connected with a first input voltage VCMI1. The second feedback resistor RF2 is bridged between the inverting input end and an output end of the second operational amplifier, and the second feedback capacitor CF2 is connected in parallel with the second feedback resistor RF2. That is to say, the second feedback resistor RF2 has a first end connected with the inverting input end of the second operational amplifier, and a second end connected with the output end of the second operational amplifier. The second feedback capacitor CF2 has a first end connected with the first end of the second feedback resistor RF2, and a second end connected with the second end of the second feedback resistor RF2. The first resistor R1 has a first end connected with the non-inverting input end of the second operational amplifier, and a second end connected with a second input voltage VCMI2, where VCMI1 and VCMI2 may be the same.

In one example, a circuit diagram of the non-inverting hysteresis comparing circuit may be as shown in FIG. 10, and includes: a first comparator, a third resistor R3, a fourth resistor R4 and a fifth resistor R5. The third resistor R3 has a first end connected with an output end V1 of the pre-amplifier circuit, and a second end connected with a non-inverting input end of the first comparator. The fourth resistor R4 is bridged between the non-inverting input end and an output end of the first comparator. That is to say, the fourth resistor R4 has a first end connected with the second end of the third resistor R3, and a second end connected with an output end V2 of the first comparator. The fifth resistor R5 has a first end connected with an input voltage VCMI, and a second end connected with an inverting input end of the first comparator.

In one example, a circuit diagram of the inverting hysteresis comparing circuit may be as shown in FIG. 12, and includes: a second comparator, a sixth resistor R6, a seventh resistor R7 and an eighth resistor R8, where the sixth resistor R6 has a first end connected with an input voltage VCMI, and a second end connected with a non-inverting input end of the second comparator. The seventh resistor R7 is bridged between the non-inverting input end and an output end of the second comparator. That is to say, the seventh resistor R7 has a first end connected with the second end of the sixth resistor R6, and a second end connected with the output end V2 of the second comparator. The eighth resistor R8 has a first end connected with the output end V1 of the pre-amplifier circuit, and a second end connected with an inverting input end of the second comparator.

Compared with existing technologies, the DSSS signal is transmitted through the coupling capacitor formed between the active stylus and the touch screen in the embodiment of the present disclosure, which can be well applied to DSSS signal transmission in a touch system. In addition, in this embodiment, only one stage of the pre-amplifier circuit, one stage of the hysteresis comparing circuit, and one stage of the digital demodulating circuit are required to implement parsing the received DSSS signal, which renders a simple circuit structure, a small quantity of hardware resources, and relatively low power consumption, and is very applicable to the interactive system of the active stylus and the touch screen that has strict requirements on a circuit size and power consumption, and the like.

An eighth embodiment of the present disclosure relates to an active stylus, including the chip according to the seventh embodiment.

A ninth embodiment of the present disclosure relates to a computer-readable storage medium, storing a computer program. The computer program, when executed by a processor, performs the above-described method for transmitting a signal embodiment.

That is, those skilled in the art may understand that implementation of all or some of the steps in the methods according to the above-described embodiments may be completed by related hardware as instructed by a program, the program may be stored in a storage medium, and include a plurality of instructions so that a device (which may be a single chip microcomputer and a chip, and the like) or a processor executes all or some of the steps of the methods as described in the various embodiments of the present disclosure. The foregoing storage medium includes: various media that can store program codes, such as a USB flash disk, a mobile hard disk, a Read-Only Memory (ROM), a Random Access Memory (RAM), a magnetic disk or an optical disk.

Those ordinarily skilled in the art may understand that, the above-described various embodiments are specific embodiments for implementing the present disclosure, and in the actual application, various changes can be made in forms and details without departing from the spirit and the scope of the present disclosure.

What is claimed is:

1. A method for transmitting a signal, applied to an active stylus, and comprising:
   receiving a DSSS signal sent by a touch screen through a coupling capacitor formed between the active stylus and the touch screen, wherein the DSSS signal is a spread-spectrum coded signal;
   pre-amplifying, by a pre-amplifier circuit, the received DSSS signal;
   inputting, by the pre-amplifier circuit, the pre-amplified DSSS signal into a hysteresis comparing circuit;
   restoring, by the hysteresis comparing circuit, the pre-amplified DSSS signal to obtain a restored DSSS signal;
   providing, by the hysteresis comparing circuit, the restored DSSS signal to a digital demodulating circuit;
   demodulating, by the digital demodulating circuit, the restored DSSS signal; and
   outputting, by the digital demodulating circuit, the signal to be transmitted.

2. The method for transmitting a signal according to claim 1, wherein demodulating, by the digital demodulating circuit, the restored DSSS signal, comprises:
   sampling, by the digital demodulating circuit, the restored DSSS signal to obtain an original coded signal;
   performing a bitwise XOR operation on the original coded signal and a preset autocorrelation demodulated signal;
   accumulating a result of the bitwise XOR operation to obtain an accumulation result; and
   demodulating the restored DSSS signal according to the accumulation result.

3. The method for transmitting a signal according to claim 2, wherein performing the bitwise XOR operation on the original coded signal and the preset autocorrelation demodulated signal, comprises:
   shifting the autocorrelation demodulated signal as a whole backward by 1 bit after every B bits of the original coded signal are collected, where B is the number of bits of the autocorrelation demodulated signal;
performing the bitwise XOR operation on the collected B bits of the original coded signal and the B-bit autocorrelation demodulated signal;
accumulating the result of the bitwise XOR operation to obtain an accumulation result, comprises:
accumulating the result of the bitwise XOR operation of the collected B bits of the original coded signal and the B-bit autocorrelation demodulated signal to obtain the accumulation result;
demodulating the restored DSSS signal according to the accumulation result, comprises:
demodulating the restored DSSS signal according to a comparison result between the accumulation result and a preset threshold.

4. The method for transmitting a signal according to claim 3, wherein the original coded signal comprises a first type signal, a second type signal and a third type signal, wherein the first type signal is a spread spectrum code corresponding to "0" in the signal to be transmitted, the second type signal is a spread spectrum code corresponding to "1" in the signal to be transmitted, and the third type signal is an unwanted signal;
if the autocorrelation demodulated signal is the first type signal, then demodulating the restored DSSS signal according to a comparison result between the accumulation result and the preset threshold, comprises:
if the accumulation result is detected to be less than or equal to a first preset threshold, identifying the collected B bits of the original coded signal as the first type signal;
if the accumulation result is detected to be greater than or equal to a second preset threshold, identifying the collected B bits of the original coded signal as the second type signal, wherein the second preset threshold is greater than the first preset threshold;
if the accumulation result is detected to be greater than the first preset threshold and less than the second preset threshold, identifying the collected B bits of the coded signal as the unwanted signal.

5. The method for transmitting a signal according to claim 4, wherein if the accumulation result is detected to be less than or equal to the first preset threshold, the method further comprises: using a time at which the collected B bits of the original coded signal starts as a time at which the identified first type signal starts;
if the accumulation result is detected to be greater than or equal to the second preset threshold, the method further comprises: using a time at which the collected B bits of the original coded signal starts as a time at which the identified second type signal starts.

6. The method for transmitting a signal according to claim 4, wherein the first preset threshold is greater than or equal to 0, and less than or equal to B*N/2, the second preset threshold is greater than B*N/2, and less than or equal to B*N, wherein N is a sampling frequency at which the digital demodulating circuit samples the restored DSSS signal.

7. The method for transmitting a signal according to claim 1, wherein the pre-amplifier circuit comprises: a non-inverting amplifier circuit or an inverting amplifier circuit.

8. The method for transmitting a signal according to claim 1, wherein the hysteresis comparing circuit comprises: a non-inverting hysteresis comparing circuit or an inverting hysteresis comparing circuit.

9. The method for transmitting a signal according to claim 1, wherein the active stylus comprises a main electrode and a secondary electrode, and the coupling capacitor formed between the active stylus and the touch screen comprises:
a coupling capacitor formed between the main electrode and the touch screen, or a coupling capacitor formed between the secondary electrode and the touch screen.

10. A chip, comprising:
a pre-amplifier circuit, configured to pre-amplify a DSSS signal sent by a touch screen and received through a coupling capacitor formed between an active stylus and the touch screen, and to output the pre-amplified DSSS signal;
a hysteresis comparing circuit, configured to restore the pre-amplified DSSS signal output by the pre-amplifier circuit to obtain a restored DSSS signal, and to output the restored DSSS signal; and
a digital demodulating circuit, configured to demodulate the restored DSSS signal output by the hysteresis comparing circuit.

11. The chip according to claim 10, wherein the digital demodulating circuit is further configured to:
sample the restored DSSS signal to obtain an original coded signal;
perform a bitwise XOR operation on the original coded signal and a preset autocorrelation demodulated signal;
accumulate a result of the bitwise XOR operation to obtain an accumulation result; and
demodulate the restored DSSS signal according to the accumulation result.

12. The chip according to claim 11, wherein the digital demodulating circuit is further configured to:
shift the autocorrelation demodulated signal as a whole backward by 1 bit after every B bits of the original coded signal are collected, where B is the number of bits of the autocorrelation demodulated signal;
perform the bitwise XOR operation on the collected B bits of the original coded signal and the B-bit autocorrelation demodulated signal;
accumulate the result of the bitwise XOR operation of the collected B bits of the original coded signal and the B-bit autocorrelation demodulated signal to obtain the accumulation result; and
demodulate the restored DSSS signal according to a comparison result between the accumulation result and a preset threshold.

13. The chip according to claim 12, wherein the original coded signal comprises a first type signal, a second type signal and a third type signal, wherein the first type signal is a spread spectrum code corresponding to "0" in the signal to be transmitted, the second type signal is a spread spectrum code corresponding to "1" in the signal to be transmitted, and the third type signal is an unwanted signal; and
wherein, if the autocorrelation demodulated signal is the first type signal, demodulating the restored DSSS signal according to a comparison result between the accumulation result and the preset threshold, comprises:
if the accumulation result is detected to be less than or equal to a first preset threshold, identifying the collected B bits of the original coded signal as the first type signal;
if the accumulation result is detected to be greater than or equal to a second preset threshold, identifying the collected B bits of the original coded signal as the second type signal, wherein the second preset threshold is greater than the first preset threshold;
if the accumulation result is detected to be greater than the first preset threshold and less than the second preset threshold, identifying the collected B bits of the original coded signal as the unwanted signal.

14. The chip according to claim 10, wherein the pre-amplifier circuit comprises an inverting amplifier circuit or a non-inverting amplifier circuit.

15. The chip according to claim 14, wherein the inverting amplifier circuit comprises a first operational amplifier, a first feedback resistor and a first feedback capacitor;
   wherein the first operational amplifier has a non-inverting input end connected with an input voltage, and an inverting input end connected with the DSSS signal;
   the first feedback resistor is bridged between the inverting input end and an output end of the first operational amplifier; and
   the first feedback capacitor is connected in parallel with the first feedback resistor.

16. The chip according to claim 14, wherein, the non-inverting amplifier circuit comprises:
   a second operational amplifier, a second feedback resistor, a second feedback capacitor, a first resistor and a second resistor;
   the second operational amplifier has a non-inverting input end connected with the DSSS signal, an inverting input end connected with a second end of the second resistor, and a first end of the second resistor is connected with a first input voltage;
   the second feedback resistor is bridged between the inverting input end and an output end of the second operational amplifier;
   the second feedback capacitor is connected in parallel with the second feedback resistor; and
   the first resistor has a first end connected with the non-inverting input end of the second operational amplifier, and a second end connected with a second input voltage.

17. The chip according to claim 10, wherein the hysteresis comparing circuit comprises a non-inverting hysteresis comparing circuit or an inverting hysteresis comparing circuit.

18. The chip according to claim 17, wherein the non-inverting hysteresis comparing circuit comprises: a first comparator, a third resistor, a fourth resistor and a fifth resistor;
   the third resistor has a first end connected with an output end of the pre-amplifier circuit, and a second end connected with a non-inverting input end of the first comparator;
   the fourth resistor is bridged between the non-inverting input end and an output end of the first comparator; and
   the fifth resistor has a first end connected with an input voltage, and a second end connected with an inverting input end of the first comparator.

19. The chip according to claim 17, wherein, the inverting hysteresis comparing circuit comprises: a second comparator, a sixth resistor, a seventh resistor and an eighth resistor;
   wherein the sixth resistor has a first end connected with an input voltage, and a second end connected with a non-inverting input end of the second comparator;
   the seventh resistor is bridged between the non-inverting input end and an output end of the second comparator;
   the eighth resistor has a first end connected with the output end of the pre-amplifier circuit, and a second end connected with an inverting input end of the second comparator.

20. An active stylus, comprising:
   at least one processor; and,
   a memory connected and in communication with the at least one processor,
   wherein the memory stores instructions executable by the at least one processor, and the instructions, when executed by the at least one processor, causes the at least one processor to perform a method for transmitting a signal, the method comprising:
   receiving a DSSS signal sent by a touch screen through a coupling capacitor formed between the active stylus and the touch screen, wherein the DSSS signal is a spread-spectrum coded signal;
   pre-amplifying, by a pre-amplifier circuit, the received DSSS signal;
   inputting, by the pre-amplifier circuit, the pre-amplified DSSS signal into a hysteresis comparing circuit;
   restoring, by the hysteresis comparing circuit, the pre-amplified DSSS signal to obtain a restored DSSS signal;
   providing, by the hysteresis comparing circuit, the restored DSSS signal to a digital demodulating circuit;
   demodulating, by the digital demodulating circuit, the restored DSSS signal; and
   outputting, by the digital demodulating circuit, the signal to be transmitted.

\* \* \* \* \*